US012561403B2

(12) United States Patent (10) Patent No.: US 12,561,403 B2
Pierret (45) Date of Patent: Feb. 24, 2026

(54) SYSTEM AND METHOD FOR COMPUTING REGION CENTERS BY POINT CLUSTERING

(71) Applicant: SoundHound AI IP, LLC, Santa Clara, CA (US)

(72) Inventor: Christophe Pierret, Sèvres (FR)

(73) Assignee: SoundHound AI IP, LLC, Santa Clara, CA (US)

( * ) Notice: Subject to any disclaimer, the term of this patent is extended or adjusted under 35 U.S.C. 154(b) by 1078 days.

(21) Appl. No.: 17/549,796

(22) Filed: Dec. 13, 2021

(65) Prior Publication Data

US 2022/0188580 A1     Jun. 16, 2022

Related U.S. Application Data

(60) Provisional application No. 63/199,181, filed on Dec. 11, 2020.

(51) Int. Cl.
| | |
|---|---|
| *G06F 7/00* | (2006.01) |
| *G06F 18/21* | (2023.01) |
| *G06F 18/22* | (2023.01) |
| *G06F 18/2321* | (2023.01) |
| *G06F 18/2413* | (2023.01) |

(52) U.S. Cl.
CPC ...... *G06F 18/24137* (2023.01); *G06F 18/217* (2023.01); *G06F 18/22* (2023.01); *G06F 18/2321* (2023.01)

(58) Field of Classification Search
CPC .. G06F 18/24137; G06F 18/217; G06F 18/22; G06F 18/2321; G06F 18/23; G01C 21/365; G01C 21/38; G06V 30/422
See application file for complete search history.

(56) References Cited

U.S. PATENT DOCUMENTS

| | | | | |
|---|---|---|---|---|
| 7,065,886 | B2 * | 6/2006 | Segur | G09B 29/005 |
| | | | | 701/445 |
| 7,805,442 | B1 * | 9/2010 | Joshi | G08G 1/096827 |
| | | | | 707/921 |
| 8,364,515 | B1 * | 1/2013 | Procopiuc | G06Q 10/04 |
| | | | | 705/14.57 |
| 8,543,586 | B2 * | 9/2013 | Glachant | H04W 4/02 |
| | | | | 701/445 |

(Continued)

FOREIGN PATENT DOCUMENTS

| | | |
|---|---|---|
| WO | 2019199298 | 10/2019 |

OTHER PUBLICATIONS

Bin Jiang, Natural Cities Generated from All Building Locations in America, University of Gävle, SE-801 76 Gävle, Sweden, Apr. 29, 2019.
Bin Jiang, Scaling of Geographic Space from the Perspective of City and Field Blocks and Using Volunteered Geographic Information, University of Gavle, SE-801 76 Gävle, Sweden, Jul. 2013.
Jorg Sander, Density-Based Clustering in Spatial Databases: The Algorithm GDBSCAN and Its Applications, University of Munich, Oettingenstr. 67, D-80538 Munchen, Germany, Apr. 1998.

(Continued)

*Primary Examiner* — Mohammed R Uddin
(74) *Attorney, Agent, or Firm* — Pearl Cohen Zedek Latzer Baratz LLP

(57) ABSTRACT

A system and a method are disclosed that calculate the center of a geographic region. A set of topological/geographical points is received. A set of clusters is determined. A weight for each cluster is computed. The highest weighted cluster is selected. The geographic region center is calculated using the selected cluster. The geographical points can include a key for each point and be filtered by an indicated key before calculating the center of a geographic location.

10 Claims, 13 Drawing Sheets

(56)　　　References Cited

U.S. PATENT DOCUMENTS

| | | | | |
|---|---|---|---|---|
| 8,676,799 | B1 * | 3/2014 | Vaver | G06F 18/23213 |
| | | | | 707/736 |
| 9,552,430 | B1 * | 1/2017 | Khan | G06F 16/9537 |
| 10,747,788 | B2 * | 8/2020 | Kecskemeti | G06F 16/29 |
| 11,194,873 | B1 * | 12/2021 | McAnally | G06F 16/9038 |
| 12,229,217 | B1 * | 2/2025 | Marsden | G06T 7/285 |
| 2001/0022558 | A1 * | 9/2001 | Karr, Jr. | G01S 5/0278 |
| | | | | 342/450 |
| 2001/0034588 | A1 * | 10/2001 | Agrawals | G01C 21/36 |
| | | | | 703/2 |
| 2002/0184063 | A1 * | 12/2002 | Kaufman | G06Q 10/0631 |
| | | | | 705/7.12 |
| 2006/0041375 | A1 * | 2/2006 | Witmer | G01C 15/00 |
| | | | | 701/532 |
| 2010/0131190 | A1 | 5/2010 | Terauchi et al. | |
| 2012/0136895 | A1 * | 5/2012 | Johnson | G09B 29/102 |
| | | | | 707/E17.11 |
| 2012/0172053 | A1 * | 7/2012 | Fukuta | G01S 19/42 |
| | | | | 455/456.1 |
| 2012/0290950 | A1 * | 11/2012 | Rapaport | H04L 12/1818 |
| | | | | 715/753 |
| 2013/0262479 | A1 * | 10/2013 | Liang | H04W 4/021 |
| | | | | 707/748 |
| 2014/0122238 | A1 * | 5/2014 | Lewis | G06Q 30/02 |
| | | | | 705/14.58 |
| 2020/0320413 | A1 | 10/2020 | Deng et al. | |
| 2020/0336400 | A1 * | 10/2020 | Juen | H04L 41/0893 |
| 2020/0408552 | A1 * | 12/2020 | Yuan | G01C 21/3807 |

OTHER PUBLICATIONS

Linda See, Crowdsourcing, Citizen Science or Volunteered Geographic Information? The Current State of Crowdsourced Geographic Information, ISPRS Int. J. Geo-Inf. 2016, 5, 55; doi:10. 3390/ijgi5050055, Apr. 27, 2016.

Martin Ester, A Density-Based Algorithm for Discovering Clusters in Large Spatial Databases with Noise, Institute for Computer Science, University of Munich Oettingenstr. 67, D-80538 Miinchen, Germany, 1996.

Massimo Buscema, The Topological Weighted Centroid (TWC): A topological approach to the time-space structure of epidemic and pseudo-epidemic processes, Apr. 19, 2017.

Slava Kisilevich, P-DBSCAN: A density based clustering algorithm for exploration and analysis of attractive areas using collections of geo-tagged photos, COM.Geo '10, Jun. 21, 2010.

Xiaojie Cui, Extracting Main Center Pattern from Road Networks Using Density-Based Clustering with Fuzzy Neighborhood, ISPRS Int. J. Geo-Inf. 2019, 8, 238; doi: 10.3390/ijgi8050238, May 21, 2019.

Fan Mo et al., "Point of Interest Recommendation by Exploiting Geographical Weighted Center and Categorical Preference", 2019 International Conference on Data Mining Workshops (ICDMW), Nov. 2019.

N. Prabhu Ram, "Offline Navigation: GPS based assisting system in Sathuragiri forests using Machine Learning", 2018 International Conference on Intelligent Computing and Communication for Smart World (I2C2SW), Dec. 2018.

* cited by examiner

SYSTEM AND METHOD FOR COMPUTING REGION CENTERS BY POINT CLUSTERING

CROSS REFERENCE TO RELATED APPLICATION

This application claims priority to U.S. Provisional Application Ser. No. 63/199,181 filed on Dec. 11, 2020 and titled COMPUTING REGION CENTERS BY POINT CLUSTERING by Christophe PIERRET, the entire disclosure of which is incorporated herein by reference.

FIELD OF THE DISCLOSURE

The present technology is in the field of geolocation and, more specifically, related to determining the geographical center of a region.

BACKGROUND

Geographic computer applications (e.g., a personal computer application, a smart phone application, etc.) commonly need to calculate the center of a geographic location (e.g., cities, provinces, states, congressional districts, boroughs, neighborhoods, arrondissements, departments, campuses, zip codes, or other geographically distributed sets of related points). The center of a geographic location is required for various geographic computer applications (e.g., navigating to the region, looking for points of interest, computing distances between regions or between a region and any other point known in a geographic information system, etc.). For a good user experience, a navigation application needs to accurately calculate geographic locations (e.g., center of location) and calculate geographic locations in a computationally efficient manner (e.g., calculate in a short period of time and without excessive power usage).

SUMMARY

The following examples describe various aspects of computing region centers by point clustering. The examples relate to processes, machines, and articles of manufacture.

One example includes a method of computing the center of a geographic region by obtaining a set of geographical points (geographical points), each having a key, building a data structure or matrix of points having a specific key, applying a clustering algorithm to determine a set of clusters, computing a weight for each cluster, and computing the center of the geographic region from the centroid of the highest-weighted cluster. This is shown to compute a center that is more accurate to what is widely accepted by most people as the center of the region. This prevents electronic navigators from getting their users lost, makes virtual assistants more useful for finding points of interest such as stores for shopping. It also improves the accuracy of geographical analysis such as calculating the real-world distance between regions.

Some examples work by computing distances between two points and using the distance in the clustering algorithm. Some examples work by computing an error between a point and a set of other points using an error measure function and using the error in the clustering algorithm. These make clustering, and therefore the resulting computed center, more accurate.

In some examples, points have more than two dimensions. This enables automatically accommodating mountainous regions on earth and applications beyond cartography.

In some examples, points have a timestamp or period. This enables automatically accommodating computations of city centers at different times historically, modeling future changes to city centers, and applications to dynamic systems beyond cartography.

Some examples also perform normalizing the scale of matrix axes. This avoids skewing results in a way that would reduce accuracy. In some examples, if the difference between the highest and second-highest weighted cluster is below a threshold, reapply the clustering algorithm with a different set of parameters. This further improves accuracy. Some examples include choosing the nearest point to the centroid as the center of the geographic region. This ensures that a center of navigation is an actual point rather than a mathematical point. This improves the practicality of different applications.

In some examples, a set of geographical points are received. A set of clusters is determined. A weight for each cluster is computed. The highest weighted cluster is selected. The geographic location center is calculated using the selected cluster. According to various examples, a geographical point may include topological information.

DETAILED DESCRIPTION

Figure 1:
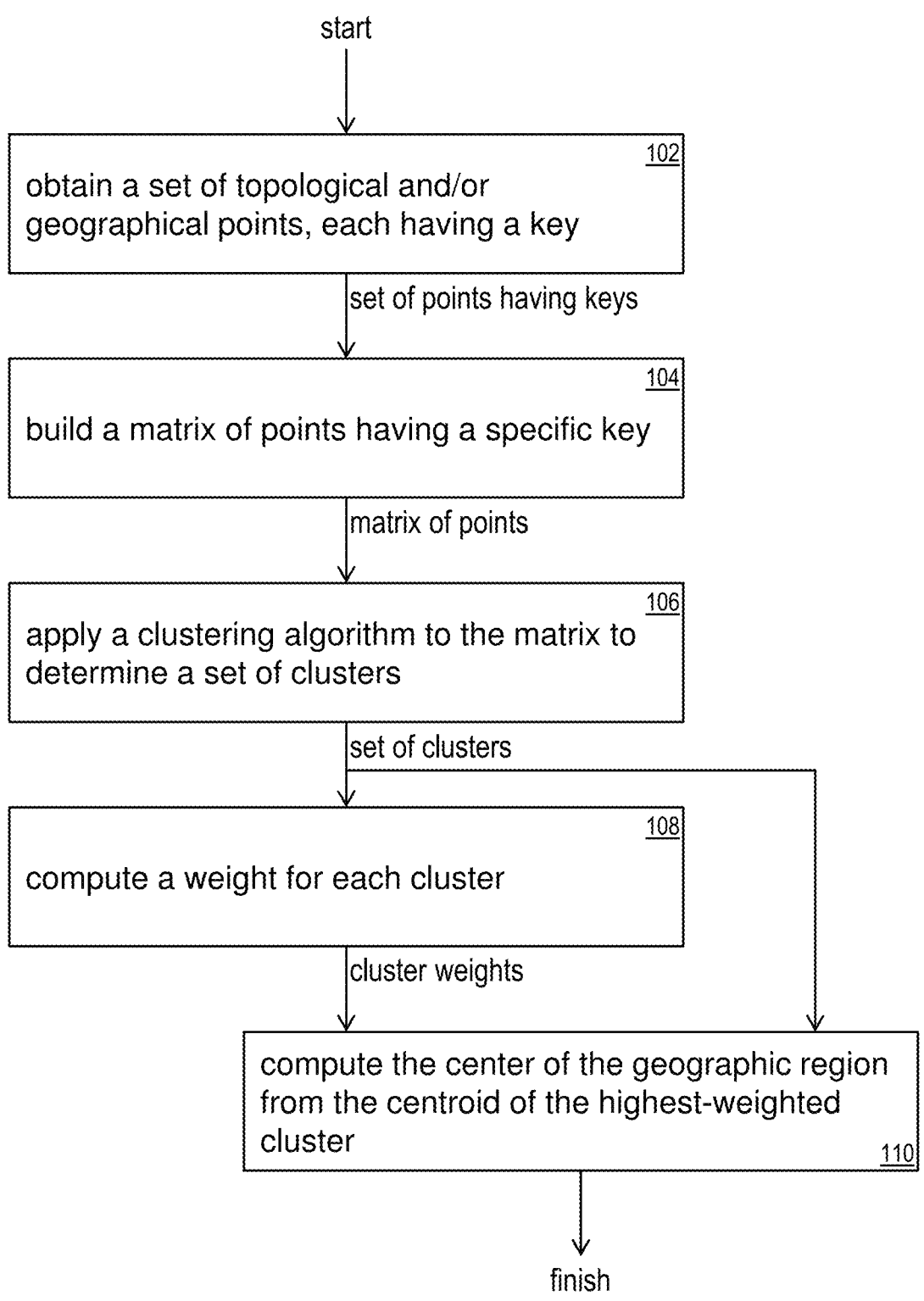
FIG. 1 is a flow diagram showing a method of calculating the center of a geographic region in accordance with various examples.

The following describes various examples of the present technology that illustrate various interesting aspects. Generally, examples can use the described aspects in any combination. All statements herein reciting principles, aspects, and examples are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "examples" or similar language means that a particular aspect, feature, structure, or characteristic described in connection with the example is included in at least one embodiment of the invention. Thus, appearances of the phrases "in one case," "in at least one example," "in an example," "in certain cases," and similar language throughout this specification may, but do not necessarily, all refer to the same embodiment or similar embodiments. Furthermore, aspects and examples of the invention described herein are merely exemplary, and should not be construed as limiting of the scope or spirit of the invention as appreciated by those of ordinary skill in the art. The disclosed invention is effectively made or used in any example that includes any novel aspect described herein. Furthermore, to the extent that the terms "including", "includes", "having", "has", "with", or variants thereof are used in either the detailed description and the claims, such terms are intended to be inclusive in a similar manner to the term "comprising." In examples showing multiple similar elements, even if using separate reference numerals, some such examples may work with a single element filling the role of the multiple similar elements.

Calculating Center of Geographic Location

The following describes systems of process steps and systems of machines and components for computing region centers by point clustering. Some implementations use computers that execute software instructions stored on non-transitory computer readable media. Examples below show design choices for various aspects of such systems. In general, design choices for different aspects are independent and can work together in any combination.

An approach to calculate the center of a geographic location is to have a person with cartography expertise curate a list of geographic location centers. As the world adds and removes cities regularly, and existing cities change, manually calculating the geographic location centers is a labor-intensive task which makes maintaining the list of geographic location centers expensive. Due to this expense, typically only highly populated areas (e.g., large cities) have the geographic centers maintained. Less densely populated areas typically do not have the geographic centers maintained due to cost of maintaining the curated list of geographic location centers.

Another approach to estimate the center of a geographic location is to use the location of a government building (e.g., city hall). Typically, choosing a government building provides acceptably accurate results for highly populated areas (e.g., large cities). Shortcomings of this approach include locations that have different government structures, and where factors (e.g., terrain, economic factors, etc.) cause the city to grow away from government locations in a pattern that is not evenly distributed.

Topological Centering

Referring now to FIG. 1, according to one or more examples, a process is shown that calculates the center of a geographic region. At step 102, a set of topological and/or geographical points are obtained where one or more of the points has a key. According to various examples, the points are labeled geographical topological points P. According to various examples, one or more points are two dimensional (e.g., longitude and latitude), three dimensional (e.g., longitude, latitude, and elevation), and/or a higher dimensional (e.g., fourth dimensional, fifth dimensional, etc.). According to various examples, one or more points include a geographical region key (e.g., name of city, region, district, country, etc.). For example, a set of points may have a key for the location of the 16th arrondissement in Paris. According to various examples, one or more points include a timestamp. For example, a city center can be tracked as the city develops over time. According to various examples, the city center may be calculated at different times and the historically city centers may be used to calculate the present city center. For example, an equation may be developed to describe the city center over time, and the equation may be used to calculate the present city center and/or the city center in the future by considering the progression of a computed center over time. According to various examples, one or more points include a time period. According to various examples, one or more points include a time period represented by a mathematical function that translates the period to a point in time.

According to various examples, one or more points may include one or more labels. For example, a label could be a category (e.g., point of interest, town hall, police station, restaurant, tourist destination, etc.). According to various examples, a label includes a classification (e.g., classification of roads/streets by their types (e.g., highway, avenue, boulevard, etc.), classification of urban city, classification of rural area, etc.). According to various examples, an application using the center of a geographic region algorithm may define custom labels for one or more points. According to various examples, one or more points may be assigned a weight. For example, a point is assigned a weight that is relative to another point. For another example, the weight may be the number of people associated with a location (e.g., number people living in a residence, number people working in an office, typical number of visitors for a location, etc.). For yet another example, the weight may be a financial metric (e.g., income of a home, income of one or more businesses at a location, etc.). According to various examples, one or more points may be assigned a weight based on a label and/or label type.

At step 104, a matrix (also called a data set or data structure) is built of points having a specific key. For example, a matrix may be built with points having the key of the 16th arrondissement in Paris. According to various examples, the matrix includes a computer data structure capable of storing a set of topological and/or geographical points. According to various examples, the matrix includes a computer data structure capable of storing a set of topological and/or geographical points, and one or more other parameters associated with each data point (e.g., altitude, a key, a timestamp, time period, label, label type, etc.). According to various examples, the matrix includes a list of latitude coordinates and a respective list of longitude coordinates. For example, for the data points [(lat1, long1), (lat2, long2), and (lat3, long3)], the latitude list is (lat1, lat2, lat3,) and the longitude list is (long1, long2, long3). According to various examples, the matrix includes a list of latitude coordinates, a respective list of longitude coordinates, a respective list of altitudes.

According to various examples, the matrix includes a list of latitude coordinates and a list of longitude coordinates where a specific index of a list corresponds to a coordinate defined by latitude and longitude. According to various examples, the matrix includes a list of latitude coordinates, a list of longitude coordinates, and a list of altitudes where a specific index of a list corresponds to a coordinate defined by latitude, longitude, and altitude. According to various examples, the matrix includes a list of latitude coordinates, a list of longitude coordinates, a list of altitudes, and list of times where a specific index of a list corresponds to a coordinate defined by latitude, longitude, altitude, and time. According to various examples, the matrix may be n×m. For example, a matrix may have a row for latitude, another row for longitude, and each column includes the respective latitude and longitude of a point. For another example, additional rows may be added for other data (e.g., altitude, category type, etc.). According to various examples, the matrix includes a list where each element in the list contains information about a geographical point. For example, each element in the list can contain a latitude and longitude. For another example, each element in the list can contain a latitude, a longitude, and other data (e.g., altitude, category type, etc.). According to various examples, the matrix includes a database. For example, the database includes a record for each point (e.g., latitude, longitude, etc.) and a field for each type of information that the database can use for one or more search keys. For example, the database includes a table with a row for each point and column for each type of information. According to various examples, the matrix has entries for a name, a latitude, a longitude, a type of point, etc. According to various examples, the matrix is labeled matrix M0.

According to various examples, the matrix may have a transformation applied to it. For example, a transformation may be applied to the matrix to normalize the scale of the axes such that each axis has a comparable span. A potential benefit of scaling transformation is to avoid skewing the distance computation based on vector orientation. According to various examples, the matrix transformed matrix is labeled matrix M1. According to various examples, an indication is received that indicates the specific key to be used to build the matrix. For example, the key could indicate that topological centering is to be performed on the 16th arrondissement of Paris.

At step 106, a clustering algorithm is applied to the matrix to determine a set of clusters. According to various examples, the clustering algorithm may be applied to matrix M0 and/or matrix M1 to create a set of N clusters C(1 . . . n). According to various examples, the clustering algorithm has the property of favoring clusters that groups points having a small distance to one or more other points within the cluster rather than trying to create clusters with even numbers of points.

According to various examples, a distance function may be used as part of the clustering algorithm. According to various examples, the distance between each point may be calculated. For example, when the set of topological and/or geographical points contains points A, B, and C, then the distance from A to B, B to C, and A to C is calculated. According to various examples, the distance between all points is estimated. According to various examples, the distance between all points is calculated using a Euclidean vector norm in a cartesian coordinate system. According to various examples, a distance function D computes the distance between two points. According to various examples, any distance function can be used that is capable of calculating and/or estimating the distance between two points. According to various examples, any coordinate system can be used that is capable of describing a point in a geographic location. According to various examples, one or more points can be assigned a weight when calculating the distance. According to various examples, the distance function is labeled D.

According to various examples, the clustering algorithm has the property of ignoring outlier points with a distance to the nearest neighbor that is greater than a threshold. According to various examples, determination of if a point is an outlier is performed by identifying the nearest point, determine distance between the point and a nearest point, and determine point is an outlier when the distance between the point and the nearest point exceeds a threshold. According to various examples, an outlier point is a point that has a different pattern compared to existing patterns in a cluster. According to various examples, a relatively small group of points may have a distance from a larger group of points, and the smaller group may be considered being an outlier group of points. According to various examples, the clustering algorithm treats outliers as noise and filters the outliers out.

According to various examples, the clustering algorithm has the property of being configured to limit the number of clusters created to be no more than a maximum number of clusters. According to various examples, the clustering algorithm has the property of being configured to limit the number points in a cluster to no more than a maximum number of points per cluster. According to various examples, the clustering algorithm is at least partially based on the Density-Based Spatial Clustering of Applications with Noise (DBSCAN) algorithm. According to various examples, the clustering algorithm is at least partially based on the Ordering Points to Identify the Clustering Structure (OPTICS) algorithm.

According to various examples, an error function may be used as part of the clustering algorithm. According to various examples, an error is calculated between a specific point and all other points. According to various examples, the error function uses a distance function. For example, the error function calculates the square root of the sum of the squared distance between a given point and all other points. According to various examples, the error function is labeled E. According to various examples, a distance function and an error function is used by the clustering algorithm.

At step 108, weights are calculated for clusters. According to various examples, the metric W is used to represent the weight of each cluster. According to various examples, the weight of each cluster is based on the number of points within each cluster. According to various examples, the weight of each cluster is at least partially based on an average of each point's weight in the cluster. According to various examples, the weight of each cluster is the sum of the weight of each point within the cluster. According to various examples, weight is calculated for each cluster. According to various examples, one or more clusters have their weight calculated.

According to various examples, the weight of the cluster is the maximum of the weight of each point within the cluster. According to various examples, the weight of each cluster is the root-mean-square of each point within the cluster. According to various examples, the highest weight cluster is labeled Ci.

According to various examples, when the highest calculated weight cluster has a weight that is within a threshold value of the weight of the next highest weight cluster, the clustering algorithm may be repeated with a different set of parameters. For example, parameters could be maximum number of clusters, maximum number of points per cluster, etc. According to various examples, the clustering algorithm can be iteratively performed to optimize results. According to various examples, parameters (e.g., maximum number of clusters, maximum number of points per cluster, etc.) are iteratively changed to search the parameter space. For example, the parameters are iteratively changed to maximize the different in weights between the highest weight cluster and the second highest weight cluster.

At step 110, the center of the geographic region is computed based on centroid of the highest weighted cluster. According to various examples, the center of the geographic region is computed based on all the points within the highest weighted cluster. According to various examples, the center of the geographic region is labeled Cfound. According to various examples, the center of the geographic region computation is based on the weights of the points within the highest weighted cluster. For example, the center of the geographic region computation is skewed by the weights of the points within the highest weighted cluster. According to various examples, the center of the geographic region is the point within the highest weight cluster that has the lowest distance to the centroid. For example, the point that has the lowest distance to Cfound. According to various examples, the center of the geographic region is computed by using an index data structure of the points for a nearest neighbor search within the highest weighted cluster. For example, the indexing structure could be a K-D Tree representation. One potential benefit of using the indexing structure is to perform a search in a shorter period of time.

According to various examples, the process of calculating the center of a geographic region may be performed on a set of points independent of the size of the area covered by the points and the number of points. According to various examples, the process of calculating the center of a geographic region may be performed on a set of points that define a region that is concave, gerrymandered, or disjoint. According to various examples, the process of calculating the center of a geographic region may be performed when the center is at an eccentric position within the region.

According to various examples, the weight of each cluster is calculated as the weighted mean center by multiplying the latitude and longitude of each point by its respective weight, summing all for both latitude and longitude individually, and then dividing this by the sum of all the weights. According to various examples, the latitude and longitude of the cluster center is calculated as:

$$\text{Latitude}_{Center} = \frac{\sum_{k=1}^{n} \text{Latitude}_i * \text{Weight}_i}{\sum_{k=1}^{n} \text{Weight}_i} \quad \text{(Eq. 1)}$$

$$\text{Longitude}_{Center} = \frac{\sum_{k=1}^{n} \text{Longitude}_i * \text{Weight}_i}{\sum_{k=1}^{n} \text{Weight}_i} \quad \text{(Eq. 2)}$$

where:

n=number of points in highest weighted cluster

Weight$_i$=weight of the respective point

According to various examples, the Weight of one or more points in Eq. 1 and/or Eq. 2 may be one.

According to various examples, when 2 or more clusters are tied for the highest weight, the first cluster in the set of clusters with the highest weight is selected. In other words, as the set of clusters is iterated through to be identified as the highest weighted cluster, the current cluster must have a higher weight than the previous cluster and this is not true when the current cluster has the same weight as the previous designated highest weight cluster. According to various examples, when 2 or more clusters are tied for the highest weight, the center of the pre-clustered points can be calculated and the cluster of the highest weight cluster that is closest to the center of the entire points is chosen as the highest weight cluster. This updates the calculation of the center of the geographical points. For example, the center of each cluster may be calculated and compared to the center of the pre-clustered points to determine the highest weighted cluster.

According to various examples, a benefit of calculating a center of a geographic location according to the invention is to automatically and precisely calculate the city center as it is generally understood by the population.

Figure 2:
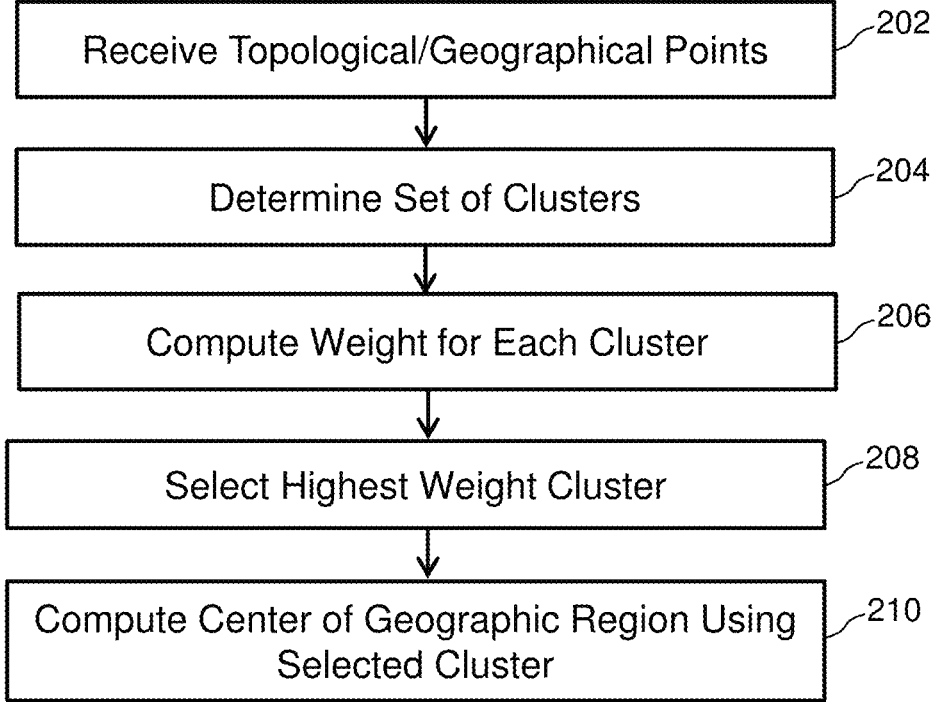
FIG. 2 is a flow diagram showing a method of calculating the center of a geographic region in accordance with various examples.

Referring now to FIG. 2, according to one or more examples, a process is shown that calculates the center of a geographic region. At step 202, a set of topological and/or geographical points is received. According to various examples, the received topological and/or geographical points is stored in one or more data structures. According to various examples, the received topological and/or geographical points is stored in a matrix. According to various examples, one or more topological and/or geographical points have a key. According to various examples, topological and/or geographical points include a key for each point, and the only the topological and/or geographical points with an indicated key are retained. According to various examples, the topological and/or geographical points may be received from any electronic source (e.g., a database, a computer file, a server, another program, etc.). According to various examples, step 202 may be the same or similar to step 102.

At step 204, a clustering algorithm is applied to the topological and/or geographical points to determine a set of clusters. According to various examples, the clustering algorithm includes, at least partially, the DBSCAN algorithm. According to various examples, step 204 is the same or similar to step 106.

At step 206, weights for clusters are computed. According to various examples, the weight for each cluster is calculated as the total of points within the cluster. According to various examples, when each point has a point weight, the weight for each cluster is calculated as the sum of the point weights within the cluster. According to various examples, when a point includes both a point (e.g., latitude and longitude) with weights and points without weights, the points without weights may be assigned a weight. For example, the points without a weight may be assigned a weight of 1, 0, a random number, average of the other weights in the cluster, etc. According to various examples, calculation of the weight can use a distance function. According to various examples, calculation of the weight can use an error function. According to various examples, calculation of the weight can use a distance function and an error function. According to various examples, weight is calculated for each cluster. According to various examples, one or more clusters have their weight calculated. According to various examples, step 206 may be the same or similar to step 108. At step 208, the highest weight cluster is selected.

At step 210, the center of the geographic region is computed based on centroid of the selected cluster. According to various examples, when the points within the highest cluster do not have a weight, the center may be calculated as an average of the respective field (e.g., latitude, longitude, elevation, etc.). According to various examples, when the points with the highest cluster have a weight, the latitude and longitude center may be calculated as:

$$\text{Latitude}_{Center} = \frac{\sum_{k=1}^{n} \text{Latitude}_i * \text{Weight}_i}{\sum_{k=1}^{n} \text{Weight}_i} \quad \text{(Eq. 3)}$$

-continued $$\text{Longitude}_{Center} = \frac{\sum_{k=1}^{n} \text{Longitude}_i * \text{Weight}_i}{\sum_{k=1}^{n} \text{Weight}_i} \qquad (Eq.\ 4)$$

where:

n=number of data points in highest weighted cluster $\text{Weight}_i$=weight of the respective point According to various examples, a similar equation to Eq. 3 and 4 may be used to calculate other points (e.g., altitude). For example, $\text{latitude}_{center}$ and $\text{latitude}_i$ in Eq. 3 can be replaced with $\text{altitude}_{center}$ and $\text{altitude}_i$, respectively. According to various examples, the center of the geographic region is computed based on centroid of the highest weighted cluster. According to various examples, step 210 may be the same or similar to step 110.

Figure 3:
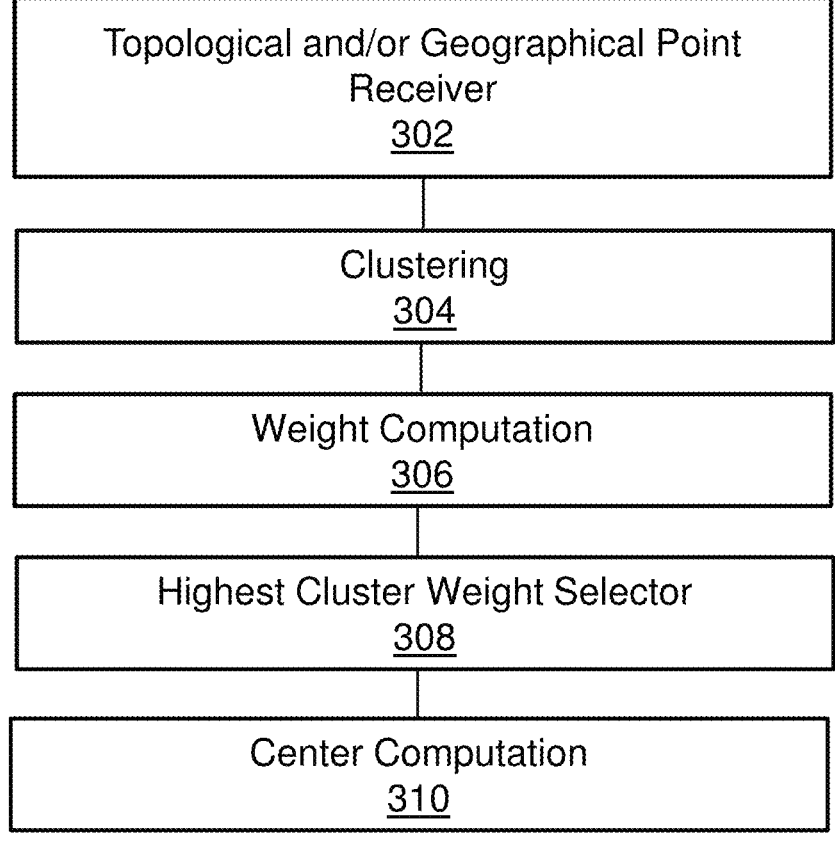
FIG. 3 shows a system's method for calculating the center of a geographic region in accordance with various examples.

Referring now to FIG. 3, according to one or more examples, a schematic is shown that calculates the center of a geographic region. Topological and/or geographical point receiver 302 receives a set of topological and/or geographical points. According to various examples, the set of topological and/or geographical points may be stored in one or more data structures. According to various examples, the set of topological and/or geographical points may be stored in a matrix. According to various examples, the topological/geographical point receiver 302 may perform the same or similar function as step 202.

Clustering 304 creates one or more clusters from the set of topological and/or geographical points. According to various examples, the clustering 304 implements, at least partially, the DBSCAN algorithm. According to various examples, the clustering 304 may perform the same or similar function as step 204.

Weight computation 306 computes a weight for each cluster. According to various examples, weight computation 306 computes the weight for each cluster by calculating the total of points within the cluster. According to various examples, when each point has a point weight, weight computation 306 computes the weight for each cluster by calculating the sum of the point weights within the cluster. According to various examples, the weight computation 306 may perform the same or similar function as step 206. Highest cluster weight selector 308 selects the cluster with the highest weight. According to various examples, the highest cluster weight selector 308 may perform the same or similar function as step 208.

Center computation 310 computes the center of the geographic region of the highest weighted cluster. According to various examples, the center of the geographic region is based on centroid of the highest weighted cluster. According to various examples, center computation 310 performs the same or similar function as step 110.

Topological Centering Examples

Figure 4A:
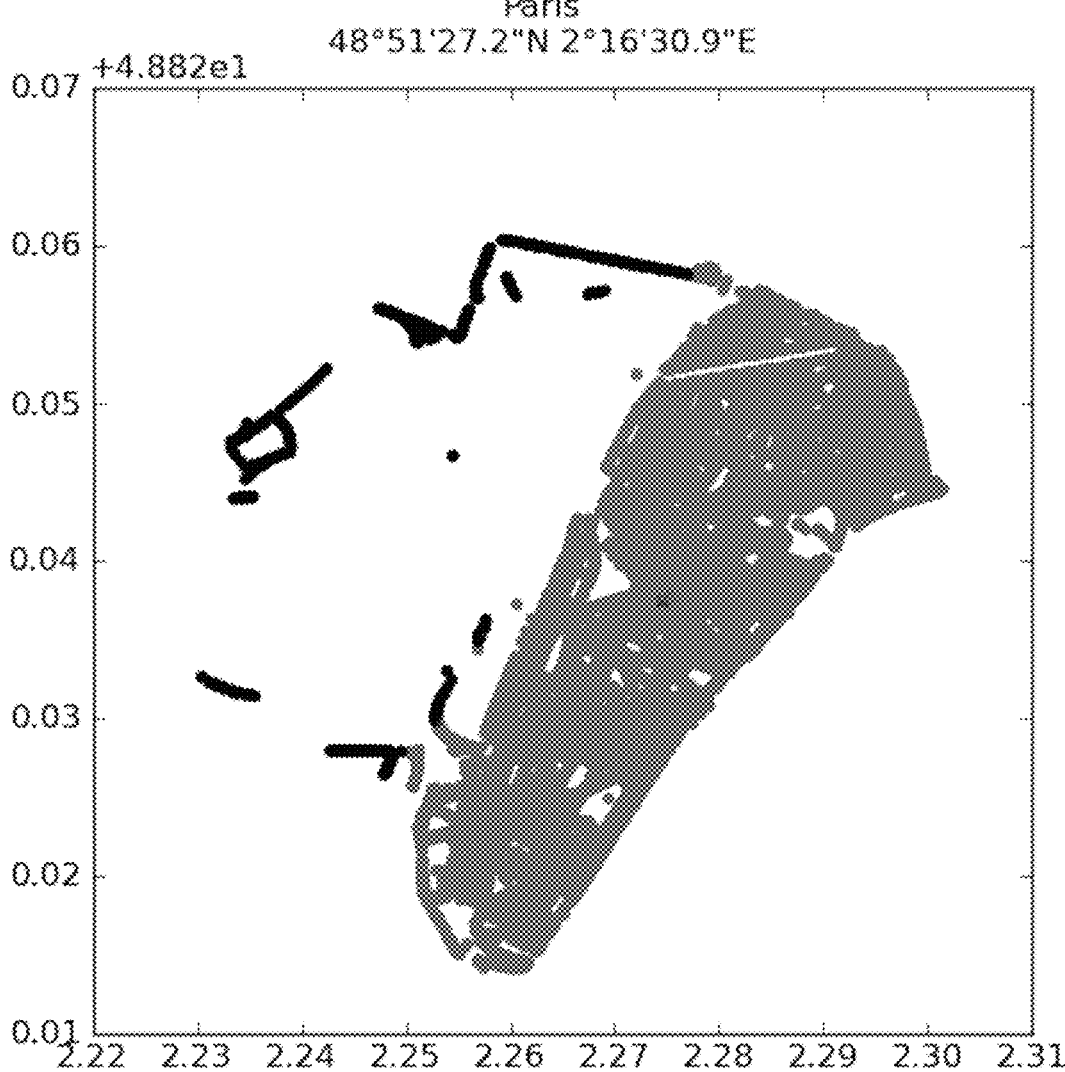
FIGS. 4A and 4B show the computed center of the highest weighted cluster for the 16th arrondissement of Paris in accordance with various examples.

Referring now to FIG. 4A, according to one or more examples, shown is a computed center of the highest weighted cluster for the 16th arrondissement of Paris. According to various examples, due to the point density of points, the clustering algorithm computes a single cluster. According to various examples, outlier points are shown in black (e.g., around the Boulogne wood and Paris' peripheral road). According to various examples, outlier points are excluded from the clustering algorithm. According to various examples, the computed center is shown with a red cross. The computed city center is calculated to be within 200 m of the La Muette metro station, which is widely considered the center of the 16th arrondissement of Paris.

Figure 4B:
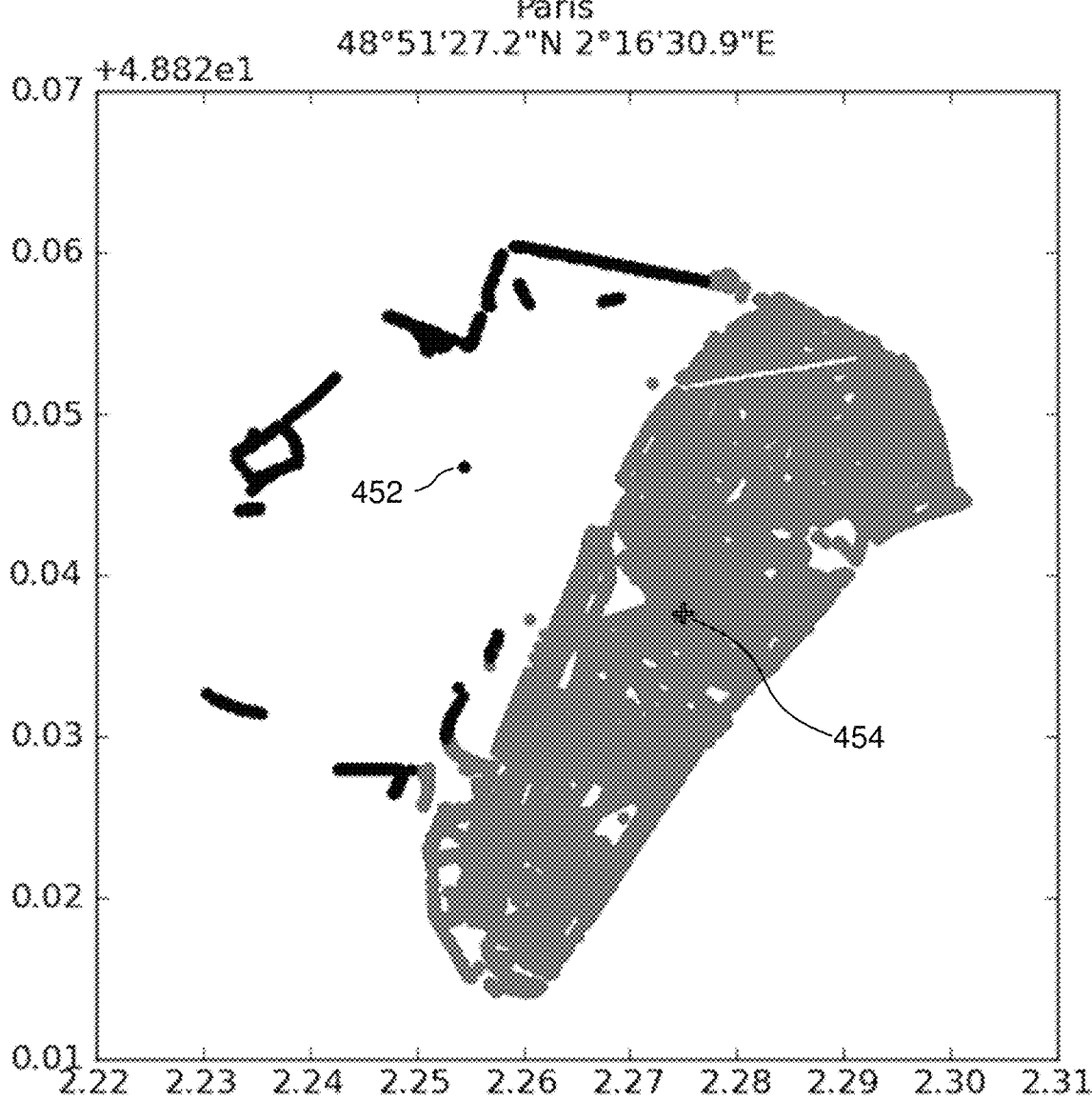

Referring now to FIG. 4B, according to one or more examples, shown is a computed center of the highest weighted cluster for the 16th arrondissement of Paris. Outlier points are shown in black (e.g., outlier 452) and the points used for the clustering algorithm is shown in gray. City center 454 is computed from the highest weighted cluster in the 16th arrondissement of Paris.

Figure 5A:
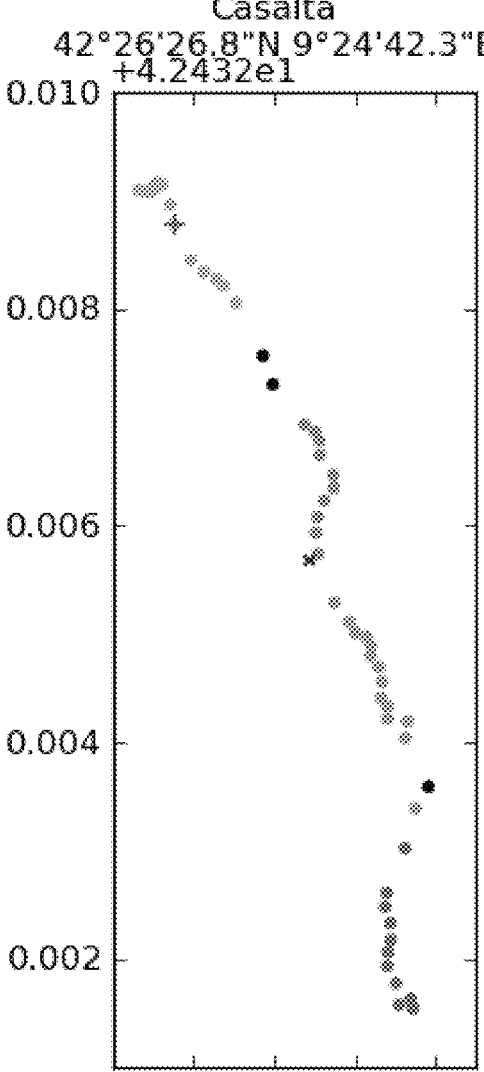
FIGS. 5A and 5B show the computed center of the highest weighted cluster for the small village of Casalta in Corsica in accordance with various examples.

Referring now to FIG. 5A, according to one or more examples, shown is a computed center of the highest weighted cluster for the small village of Casalta in Corsica. According to various examples, four clusters are found (shown in blue, orange, pink, and green) and the outlier points are shown in black. According to various examples, the blue cross shows the centroid of all points. According to various examples, the computed center is shown with a red cross, which is widely regarded as the city center of Casalta.

Figure 5B:
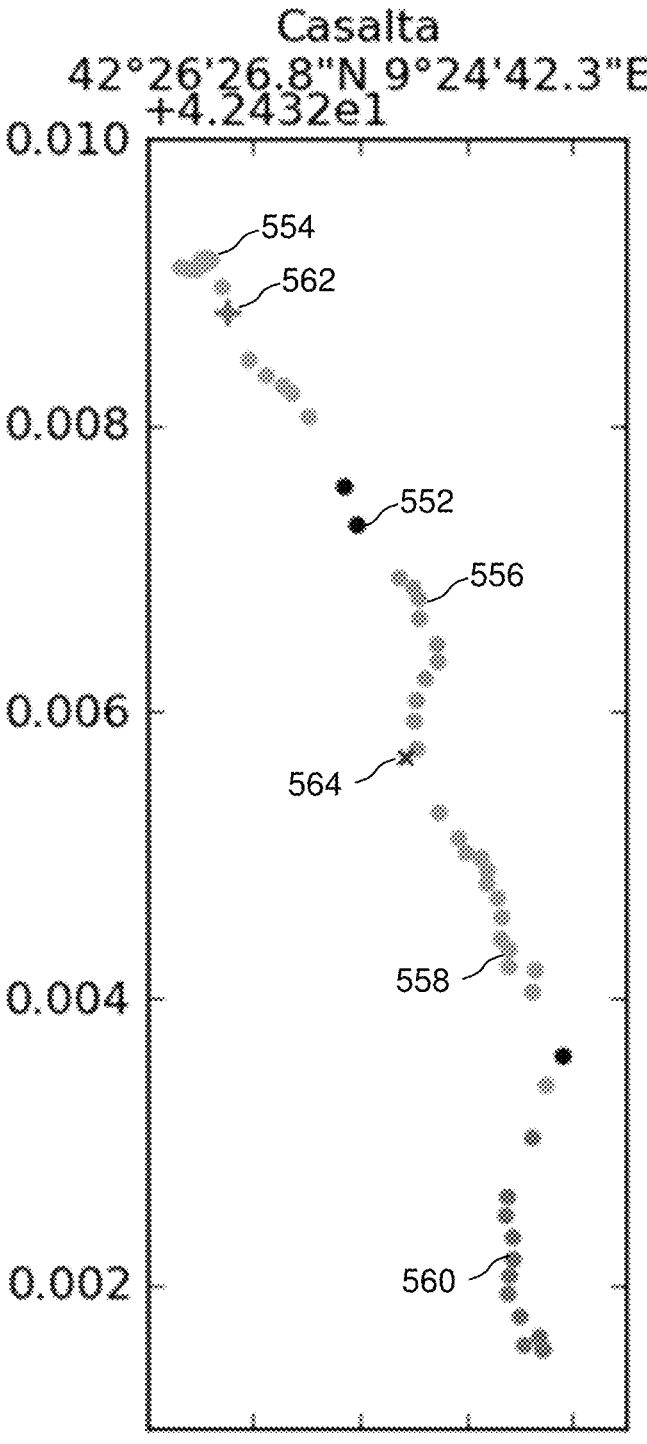

Referring now to FIG. 5B, according to one or more examples, shown is a computed center of the highest weighted cluster for the small village of Casalta in Corsica. Outlier points are shown in black (e.g., outlier 552). Clusters are shown in different shades of gray (e.g., first cluster 554, second cluster 556, third cluster 558, and fourth cluster 560). According to various examples, the cross 564 shows the centroid of all points. According to various examples, computed center 562 is shown and is widely regarded as the city center of Casalta.

Figure 6A:
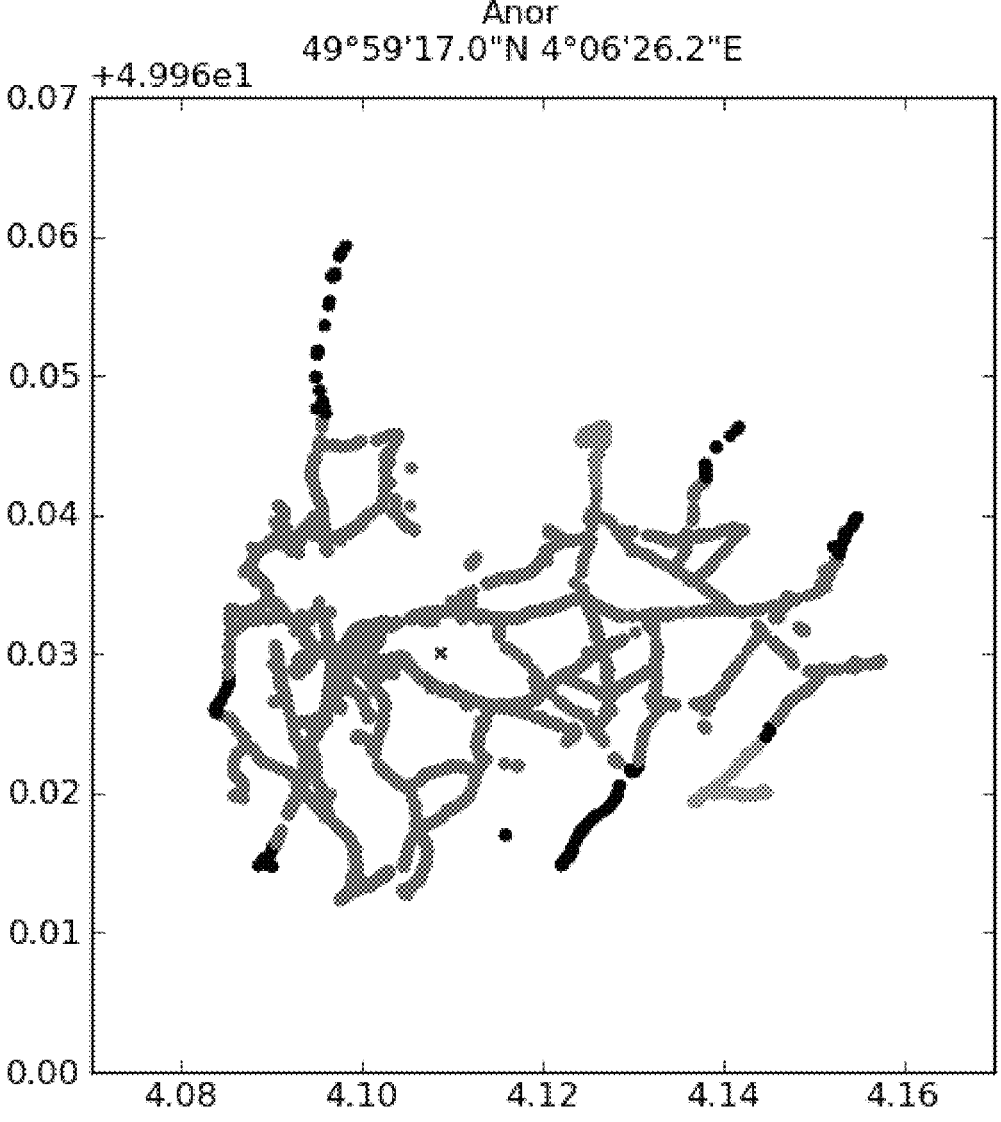
FIGS. 6A and 6B show the computed center of the highest weighted cluster for the city of Anor in France in accordance with various examples.

Referring now to FIG. 6A, according to one or more examples, shown is a computed center of the highest weighted cluster for the city of Anor in France. According to various examples, three clusters are found (shown in green, orange, and blue) and the outlier points are shown in black. According to various examples, the computed center is determined to be a point with the shortest distance to the topological centroid and is shown as a red cross.

Figure 6B:
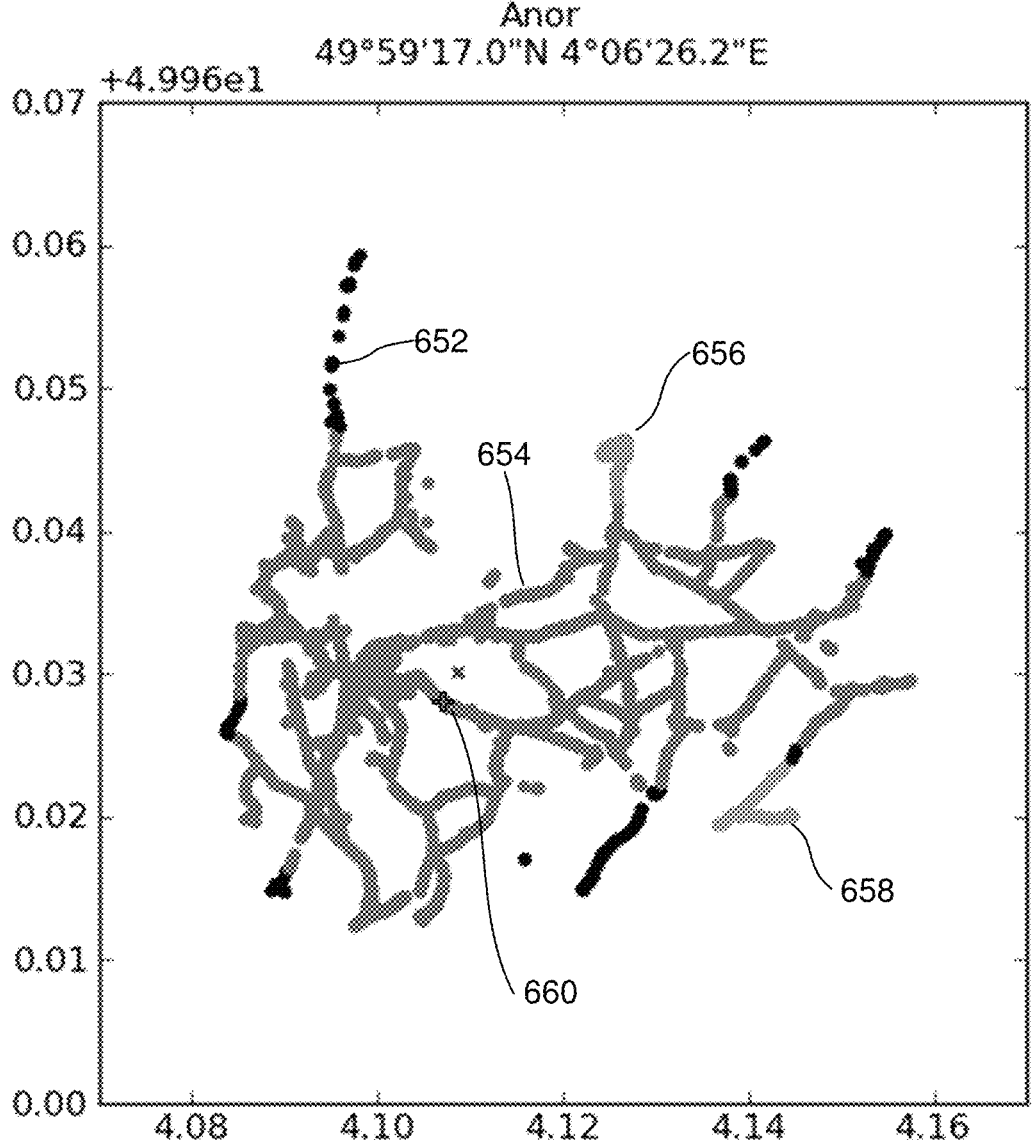

Referring now to FIG. 6B, according to one or more examples, shown is a computed center of the highest weighted cluster for the city of Anor in France. Outlier points are shown in black (e.g., outlier 652). Clusters are shown in different shades of gray (e.g., first cluster 654, second cluster 656, and third cluster 658). According to various examples, the computed center is determined to be a point with the shortest distance to the topological centroid and is shown as cross 660.

Figure 7A:
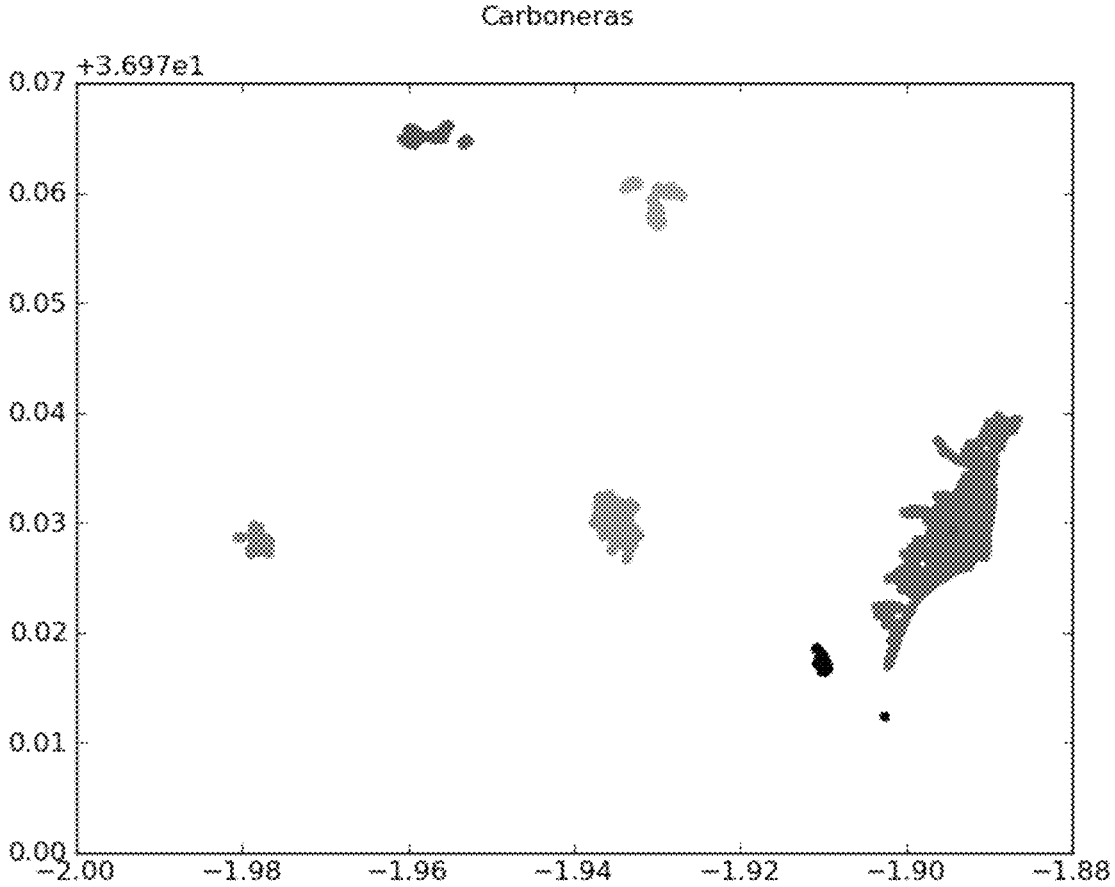
FIGS. 7A and 7B show the computed center of the highest weighted cluster for the city of Carboneras in the province of Almeria, Spain in accordance with various examples.

Referring now to FIG. 7A, according to one or more examples, shown is a computed center of the highest weighted cluster for the city of Carboneras in the province of Almeria, Spain. According to various examples, five clusters are found (shown in blue, orange, pink, maroon, and green) and the outlier points are shown in black. According to various examples, the computed city center is shown as a red dot.

Figure 7B:
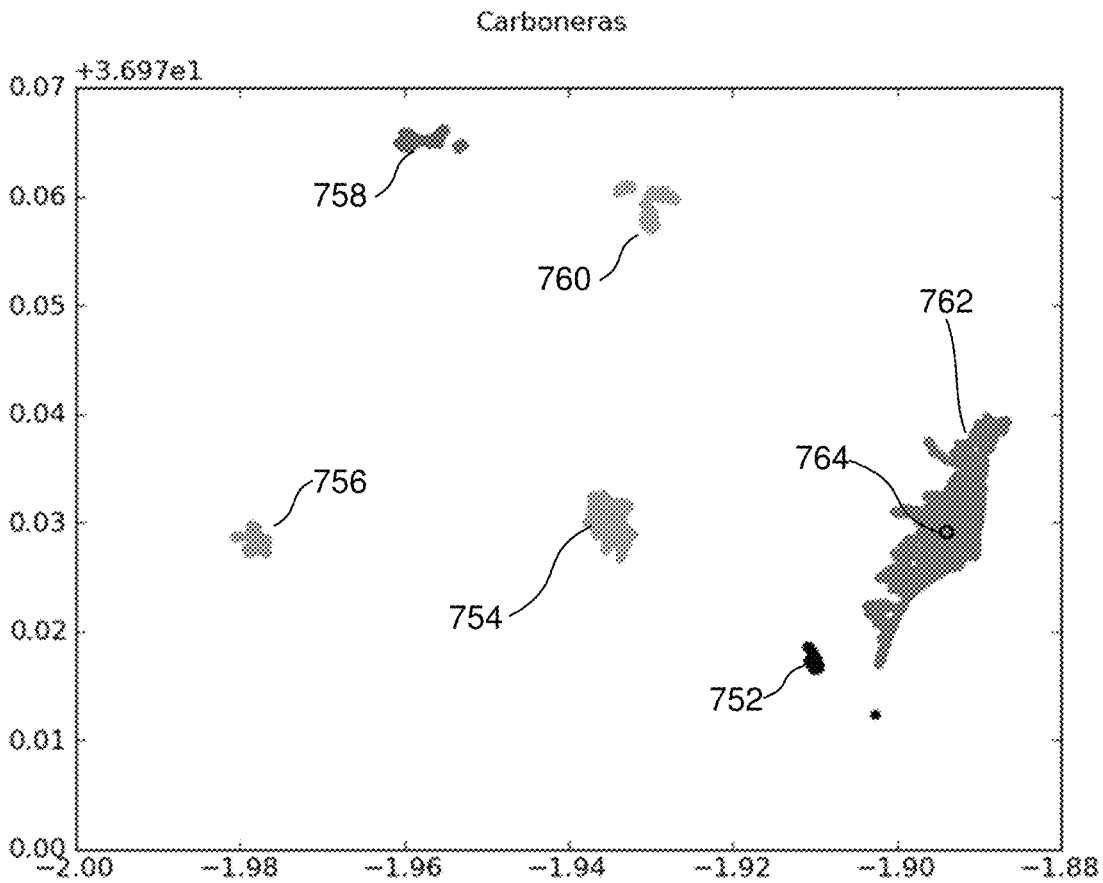

Referring now to FIG. 7B, according to one or more examples, shown is a computed center of the highest weighted cluster for the city of Carboneras in the province of Almeria, Spain. Outlier points are shown in black (e.g., outlier 752). Clusters are shown in different shades of gray (e.g., first cluster 754, second cluster 756, third cluster 758, fourth cluster 760, and fifth cluster 762). According to various examples, the computed center is determined to be point 764.

Topological Centering Application

Figure 8:
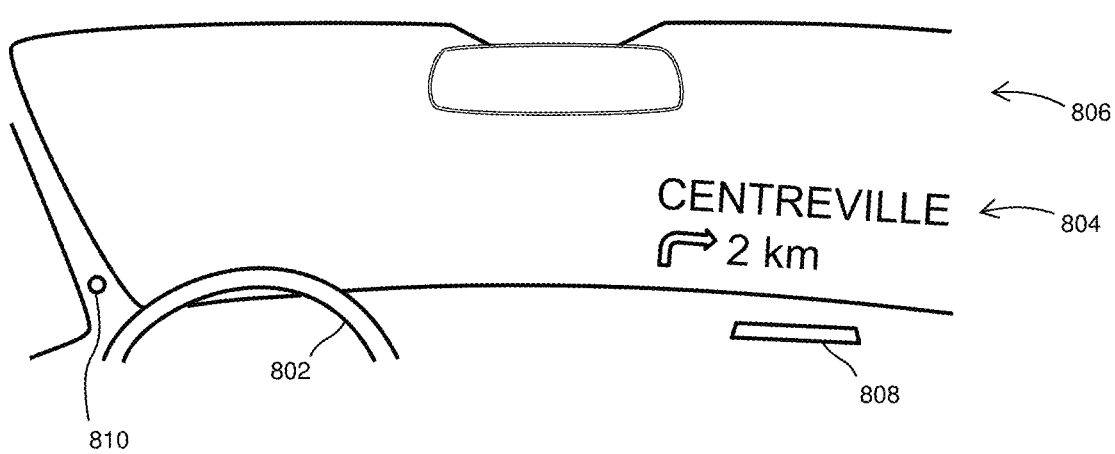
FIG. 8 is an interior view of an automobile that shows a navigation system using geographical center in accordance with various examples.

Referring now to FIG. 8, shown is an interior view of an automobile with a navigation system using topological center in accordance with various examples. According to various examples, the navigation system provides directions to a driver of the automobile to a region center that was calculated using topological centering. According to various examples, the automobile is at least partially controlled by steering wheel 802. According to various examples, the navigation system provides driving instructions 804 on the windshield 806 using projector 808. According to various examples, the navigation system provides driving instructions to the driver using speaker 810. According to various examples, the navigation system provides driving instructions both by projector 808 and speaker 810. According to various examples, navigation instructions can be displayed to the driver using any electronic device (e.g., GPS screen, screen built into the automobile (e.g., infotainment system), the driver's smart phone, etc.).

According to various examples, the user instructs the navigation system to navigate to the center of the 16th arrondissement of Paris. The navigation system will calculate the center of the 16th arrondissement of Paris using topological centering. The center calculation may be performed on the navigation system, on a remote computer (e.g., server), or a combination of the aforementioned. Once the center of the 16th arrondissement of Paris is calculated, the navigation will create directions from the current location of the automobile to the center of the 16th arrondissement of Paris and provide instructions for the driver to navigate to the center of 16th arrondissement of Paris.

Topological Centering Non-Transitory Computer-readable Media

Figure 9:
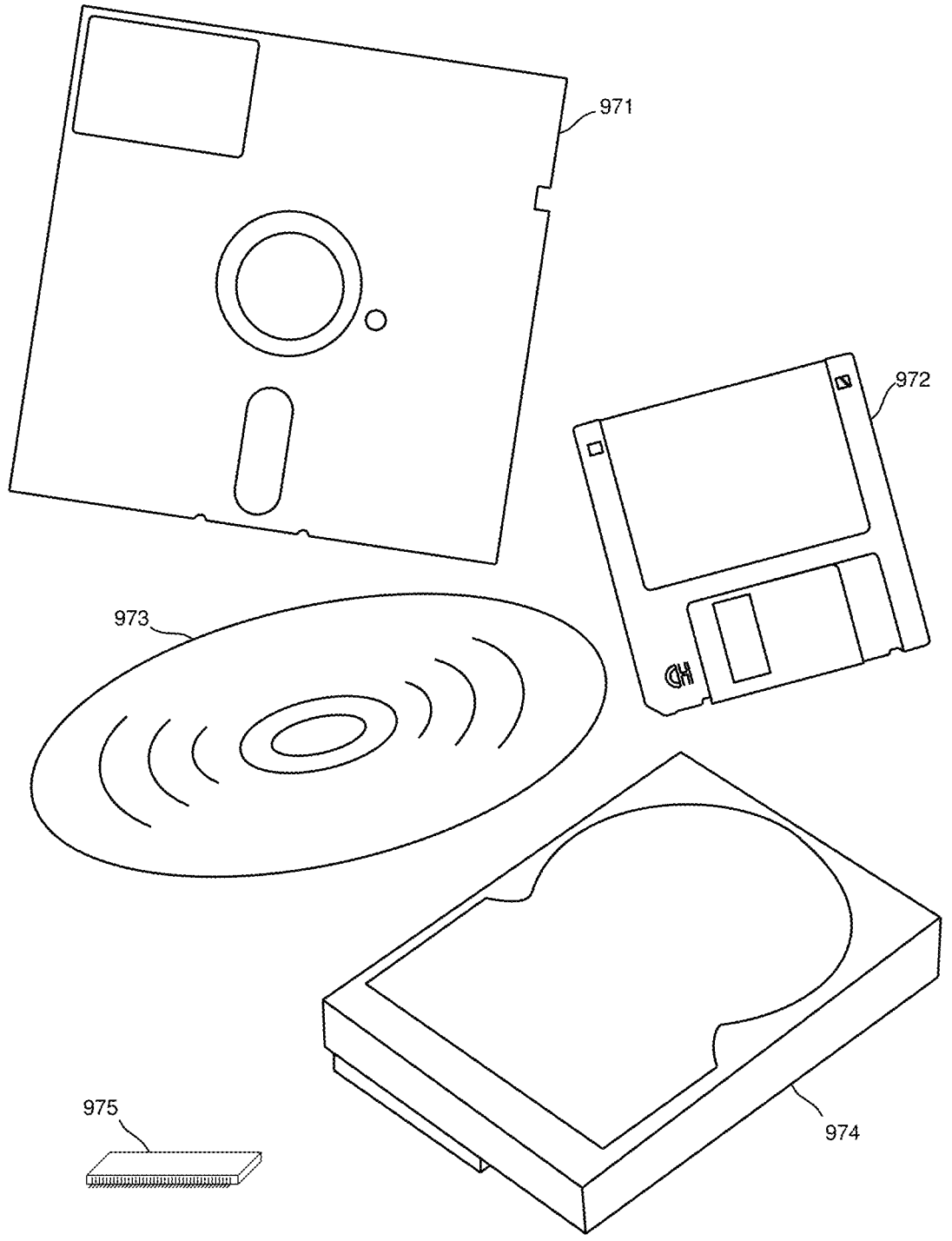
FIG. 9 shows non-transitory computer-readable media for storing instructions that, if executed by one or more computers, would cause the computers to compute a region center by point clustering.

Referring now to FIG. 9, shown is a collection of five non-transitory computer-readable media, any of which can store instructions that, if executed by one or more computers, would cause the one or more computers to perform any of the methods described. The collection has a 5.25-inch floppy disk 971, a 3.5-inch floppy disk 972, a compact disc 973, a hard disk drive 974, and a Flash random access memory chip 975.

Some computer systems that perform the methods described function by running software on general-purpose programmable processors (CPUs) such as ones with ARM or x86 architectures, which are programmable with widely available compilers and open-source software development tools. Some systems use graphics processing units (GPUs), which can, in some cases, deliver higher performance than general-purpose processors. Descriptions herein reciting principles, features, and examples encompass structural and functional equivalents thereof. Practitioners skilled in the art will recognize many modifications and variations. In accordance with the teachings herein, a client device, a computer and a computing device are articles of manufacture. Other examples of an article of manufacture include: an electronic component residing on a motherboard, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

Although certain examples are described, it is apparent that equivalent alterations and modifications will occur to others skilled in the art upon the reading and understanding of this specification and the drawings. Practitioners skilled in the art will recognize many modifications and variations. The modifications and variations include any relevant combination of the disclosed features. In particular regard to the various functions performed by the above described components (assemblies, devices, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments. In addition, while a particular feature may have been disclosed with respect to only one of several embodiments, such feature may be combined with one or more other features of the other embodiments as may be desired and advantageous for any given or particular application.

Some embodiments of physical machines described and claimed herein are programmable in numerous variables, combinations of which provide essentially an infinite variety of operating behaviors. Some embodiments herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines can embody machines described and claimed herein, such as: semiconductor chips; hardware description language representations of the logical or functional behavior of machines according to the invention described and claimed; and one or more non-transitory computer readable media arranged to store such hardware description language representations.

An article of manufacture or system, in accordance with an embodiment of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Furthermore, examples and conditional language recited herein are principally intended to aid the reader in understanding the principles of the invention and the concepts contributed by the inventors to furthering the art and are to be construed as being without limitation to such specifically recited examples and conditions. Moreover, statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the invention, therefore, is not intended to be limited to the exemplary embodiments or the various aspects shown and described herein. Rather, the scope and spirit of the present invention is embodied by the appended claims.

What is claimed is:

1. A method comprising:
   receiving a set of geographical points within a geographic region;

determining a set of clusters from the set of geographical points;

calculate weights for clusters in the set of clusters, wherein one cluster is a highest weighted cluster; and identify a center of the geographic region using a centroid of the highest weighted cluster; and wherein the set of geographical points include a time associated with geographical points and wherein computing the center of the geographic region includes using progression of a computed center over time to calculate a present city center.

2. The method of claim 1 further comprising:

calculating a points center for the set of geographical points when multiple clusters from the set of clusters have the same highest weight; and selecting the centroid of the cluster having its centroid closest to the points center of the set of geographical points as an updated center.

3. The method of claim 1, wherein the set of geographical points includes a latitude and longitude for points of the set of geographical points.

4. The method of claim 3, wherein computing centers of geographic regions for the highest weighted cluster includes performing computations:

$$\text{Latitude}_{center} = \frac{Xjl, \, Latitudei * Weighti}{\hat{} = 1 \, Weighti}$$

$$\text{Longitude}_{center} = \frac{SjLi, \, Longitudei * Weighti}{Z\hat{} Weighti}$$

wherein "n" represents number of points in the highest weighted cluster and "Weightr" represents weight of a respective point and the summation is across the latitudes and longitudes of the points in the highest weighted cluster.

5. The method of claim 1, wherein the weight is calculated based on number of points within a respective cluster.

6. The method of claim 1, wherein the set of geographical points include respective point weights and weights for clusters are calculated as sums of weights of point weights within the respective clusters.

7. The method of claim 1, wherein weights for geographical points in the set of geographical points are calculated as the number of people living at residences identified by the respective geographical points.

8. The method of claim 1, wherein determining a set of clusters includes repeating clustering with a different set of parameters when a difference between the highest weighted cluster and a second-highest weighted cluster is below a threshold.

9. The method of claim 1, wherein computing the center of the geographic region includes selecting a nearest point to the centroid of the highest weighted cluster as the center of the geographic region.

10. A non-transitory computer-readable medium storing instructions that, if executed by one or more computers, would cause the one or more computers to:

receive a set of geographical points within a geographic region;

determine a set of clusters from the set of geographical points;

determine weights for clusters in the set of clusters, wherein one cluster is a highest weighted cluster; and determine a center of the geographic region using a centroid of the highest weighted cluster; and wherein the set of geographical points include a time associated with geographical points and wherein computing the center of the geographic region includes using progression of a computed center over time to calculate a present city center.

* * * * *